(12) United States Patent
Xu et al.

(10) Patent No.: US 10,331,616 B2
(45) Date of Patent: Jun. 25, 2019

(54) INTEGRATION OF NETWORK LINECARD (LC) TO HOST OPERATING SYSTEM (OS)

(71) Applicant: Futurewei Technologies, Inc., Plano, TX (US)

(72) Inventors: Jun Xu, Cupertino, CA (US); Rangaraju Iyengar, Morgan Hill, CA (US)

(73) Assignee: Futurewei Technologies, Inc., Plano, TX (US)

( * ) Notice: Subject to any disclaimer, the term of this patent is extended or adjusted under 35 U.S.C. 154(b) by 784 days.

(21) Appl. No.: 14/818,931

(22) Filed: Aug. 5, 2015

(65) Prior Publication Data

US 2017/0039166 A1 Feb. 9, 2017

(51) Int. Cl.
| | |
|---|---|
| *G06F 9/50* | (2006.01) |
| *G06F 15/78* | (2006.01) |
| *G06F 13/42* | (2006.01) |
| *G06F 9/455* | (2018.01) |
| *G06F 13/40* | (2006.01) |
| *G06F 9/4401* | (2018.01) |
| *G06F 13/10* | (2006.01) |

(52) U.S. Cl.
CPC ........ *G06F 15/7825* (2013.01); *G06F 9/4411* (2013.01); *G06F 9/45558* (2013.01); *G06F 9/5011* (2013.01); *G06F 13/4022* (2013.01); *G06F 13/4282* (2013.01); *G06F 13/102* (2013.01); *G06F 2009/45579* (2013.01); *G06F 2009/45595* (2013.01)

(58) Field of Classification Search
CPC ....... G06F 9/45558; G06F 2009/45595; H04L 49/70

USPC ......................................................... 710/313
See application file for complete search history.

(56) References Cited

U.S. PATENT DOCUMENTS

| | | | | |
|---|---|---|---|---|
| 8,219,712 | B2* | 7/2012 | Riddoch | G06F 13/4221 707/600 |
| 8,427,972 | B2* | 4/2013 | Wang | H04L 45/586 370/252 |
| 2005/0210479 | A1* | 9/2005 | Andjelic | H04L 49/90 719/321 |

(Continued)

FOREIGN PATENT DOCUMENTS

| | | |
|---|---|---|
| JP | 2007264854 A | 10/2007 |
| JP | 2014096675 A | 5/2014 |
| WO | 2014004060 A1 | 1/2014 |

OTHER PUBLICATIONS

Foreign Communication From A Counterpart Application, PCT Application No. PCT/CN2016/092484, English Translation of International Search Report dated Oct. 26, 2016, 4 pages.

(Continued)

*Primary Examiner* — Titus Wong
(74) *Attorney, Agent, or Firm* — Conley Rose, P.C.

(57) ABSTRACT

An apparatus comprising a plurality of physical IO ports configured to couple to a plurality of remote LCs that provide IO resources, and a processor coupled to the plurality of physical IO ports and configured to map the remote LCs to a plurality of vNICs by allocating at least some of the IO resources to the local vNICs, receive an OS kernel IO call comprising a request to access a first of the vNICs, determine a first of the remote LCs that corresponds to the first vNIC, and direct the request to access the first remote LC.

20 Claims, 9 Drawing Sheets

(56) References Cited

U.S. PATENT DOCUMENTS

| | | | |
|---|---|---|---|
| 2008/0043765 | A1 | 2/2008 | Belgaied et al. |
| 2012/0069730 | A1 | 3/2012 | Johnsen |
| 2012/0079143 | A1 | 3/2012 | Krishnamurthi et al. |
| 2013/0104127 | A1 | 4/2013 | Domsch et al. |
| 2013/0138836 | A1 | 5/2013 | Cohen et al. |
| 2013/0215754 | A1 | 8/2013 | Tripathi et al. |
| 2014/0130046 | A1 | 5/2014 | Okuno et al. |
| 2015/0012606 | A1 | 1/2015 | Gadipudi |
| 2016/0034317 | A1* | 2/2016 | Nair .................. H04L 12/4641 709/223 |

OTHER PUBLICATIONS

"Virtual Bridged Local Area Networks—Bridge Port Extension," IEEE Standard for Local and Metropolitan Area Networks, IEEE Std 802.1BR, IEEE Computer Society, IEEE Standards Association, 2012, 135 pages.

"Broadcom Open 1.0 Leaf and Spine Switch Specification," Open Compute Project, Oct. 2013, 47 pages.

Foreign Communication From A Counterpart Application, European Application No. 16832287.3, Extended European Search Report dated May 30, 2018, 8 pages.

Machine Translation and Abstract of Japanese Publication No. JP2007264854, Oct. 11, 2007, 19 pages.

Foreign Communication From A Counterpart Application, Japanese Application No. 2017-564495, Japanese Notice of Rejection dated Feb. 6, 2019, 5 pages.

\* cited by examiner

INTEGRATION OF NETWORK LINECARD (LC) TO HOST OPERATING SYSTEM (OS)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Peripheral Component Interconnect (PCI) bus is present in a wide variety of computer systems, such as Personal Computers (PCs), servers, and multi-chassis systems. PCI bus provides a channel for computer components and/or peripherals to communicate with a Central Processing Unit (CPU). Various versions of PCIs have been developed to improve performance through different bus architectures and additional functionalities. For example, the original PCI employs a shared parallel bus architecture, in which a PCI host and all its devices share a common set of addresses, data, and control lines, whereas the successor PCI-Express (PCIe) is based on a point-to-point topology, which employs separate serial links to connect every device to a PCIe host. Since each PCIe device has its own dedicated serial connection to the PCIe host, PCIe provides higher throughput and lower latency than the original PET

SUMMARY

In one embodiment, the disclosure an apparatus comprising a plurality of physical input/output (IO) ports configured to couple to a plurality of remote linecards (LCs) that provide IO resources, and a processor coupled to the plurality of physical IO ports and configured to map the remote LCs to a plurality of virtual network interface cards (vNICs) by allocating at least some of the IO resources to the local vNICs, receive an operating system (OS) kernel IO call comprising a request to access a first of the vNICs, determine a first of the remote LCs that corresponds to the first vNIC, and direct the request to access the first remote LC.

In another embodiment, the disclosure includes a method implemented by a local server host that operates under an OS comprising obtaining IO resource information of a plurality of remote LCs coupled to the local server host, defining an IO resource pool according to the IO resource information of the remote LCs, determining a mapping between the remote LCs and a plurality of vNICs by allocating IO resources from the IO resource pool according to the IO resource information of the remote LCs, receiving an OS kernel IO call comprising a request to access a first of the vNICs, determining a first of the remote LCs that corresponds to the first vNIC, and directing the request to access the first remote LC.

In yet another embodiment, the disclosure includes an apparatus comprising a plurality of physical IO ports configured to couple to a plurality of remote LCs that provides IO resources, and a remote host, and a processor coupled to the plurality of physical IO ports and configured to obtain resource information of the plurality of remote LCs, define an IO resource pool according to the resource information of the remote LCs, determine a mapping between the remote LCs and a plurality of vNICs by allocating IO resources to the vNICs from the IO resource pool, wherein at least a first of the vNICs are associated with the remote host, and send, via the IO ports, a configuration message to the remote host, wherein the configuration message comprises configuration information associated with the first vNIC.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
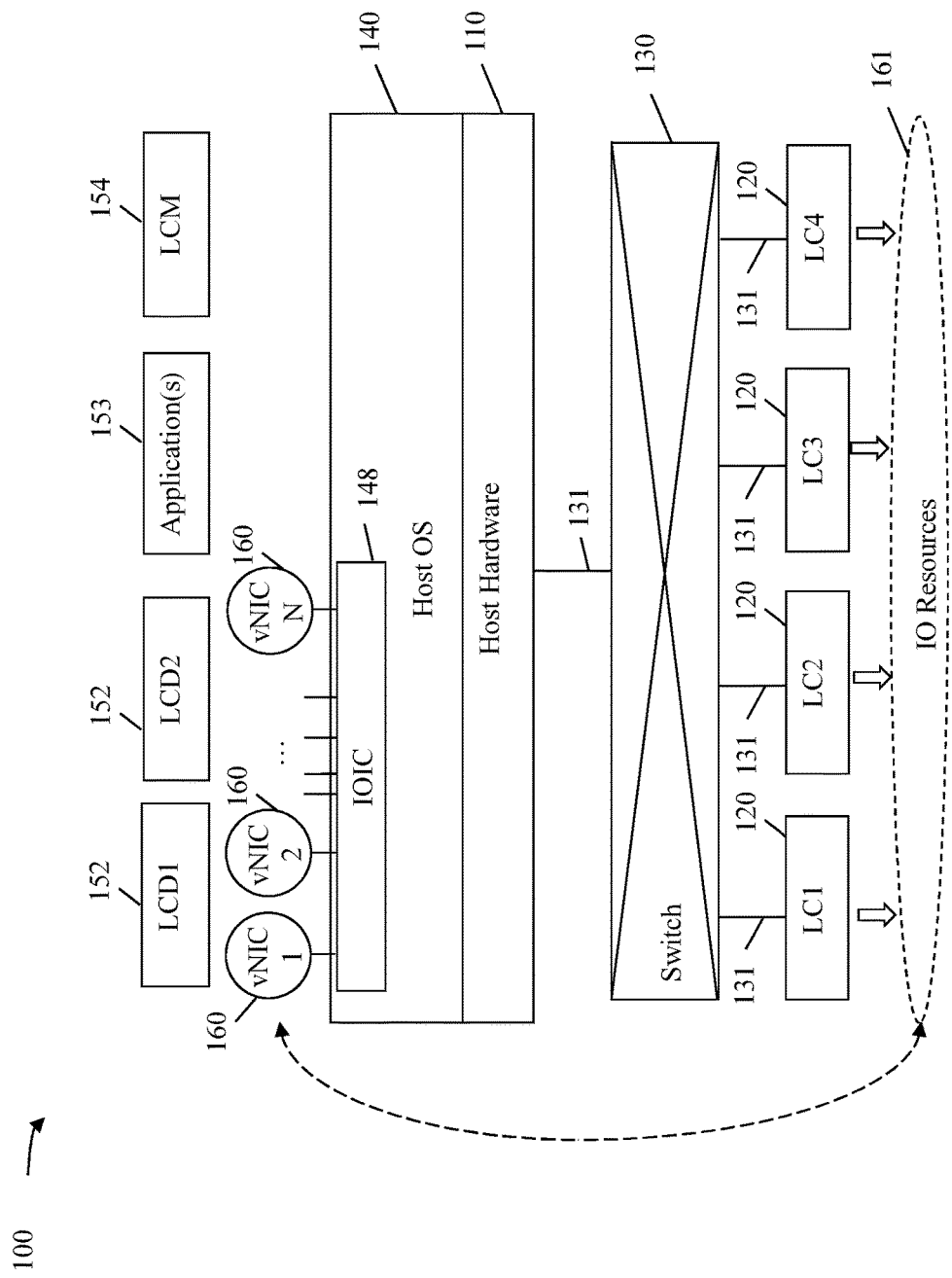
FIG. 1 is a schematic diagram of an embodiment of a computer system operating in a single host environment.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An OS is software that manages computer hardware and software resources and provides common services for computer programs and applications. For example, an OS may provide a set of kernel calls or system calls that may be used by the computer programs and applications to access the common services. Basic tasks performed by an OS may include allocating memory, prioritizing system requests, controlling IO devices facilitating networking and/or managing file systems. Some examples of general or common OSs that are employed by modern computer systems may include Windows®, Unix®, and Linux®.

PCI and/or PCIe are employed as part of the bus system for many computer systems and PCI and/or PCIe devices are integrated with most general OSs as local IO devices. Local IO devices are devices that are directly connected to the computer systems via local bus systems in contrast to networking devices that are remotely connected to the computer systems via network connections. For example, PCI and/or PCIe devices may be accessed and controlled in a computer system via a device-configuration memory space. On system startup (e.g., powered-on), the basic input/output system (BIOS) of the computer system may detect and configure attached PCI and/or PCIe devices through the device-configuration memory space. For example, the BIOS may determine the memory or IO base address and/or interrupt (IRQ) lines for each of the attached PCI and/or PCIe devices. In addition, a device driver corresponding to each PCI device may be loaded and device-specific configurations may be handled by the device driver. Subsequently, a general OS executing on top of the BIOS may provide applications with IO accesses to the attached PCI devices. For example, each of the general OSs may provide a set of kernel calls or system calls for reading and/or writing data to the attached PCI devices.

Data centers (DCs) continue to grow as digital assets increase and more applications are deployed. To meet the growing demand, server and/or storage virtualization are commonly employed by DCs. Server and/or storage virtualization refers to a software abstraction technique that separates a physical resource and its use from the underlying physical machine. Most physical resources may be abstracted and provisioned as virtualized entities. Some examples of virtualized entities may include CPUs, network IOs, and storage IOs. For example, a DC may house a plurality of server racks or chassis-based systems. Each server rack comprises a plurality of mounting slots or bays designed to hold LCs (e.g., computing and/or storage hardware units) and a backplane that provides connections to the LCs. One or more host machines or server hosts may be distributed across the server racks to provide management and control functions to the LCs. Due to high bandwidth and/or throughput requirements, the LCs installed at a server rack are typically interconnected via different interconnect technologies than the PCI and/or the PCIe. As such, when a host machine employs a general OS, the LCs may not be directly integrated with the general OS as local IOs or local NICs. For example, some DCs employ switching fabric technology (e.g., crossbar switches) to interconnect server racks and/or LCs, while some other DCs employ Open System interconnection (OSI) layer two (L2) and/or layer three (L3) network technologies (e.g., Ethernet switches and/or IP switches) to interconnect server racks and/or LCs. Thus, a server host that employs a general OS may not employ the same mechanisms as PCI device integration to integrate the LCs as local IO devices and/or resources.

Several approaches have been developed in industry to integrate LCs and/or IO devices that are not based on PCI and/or PCIe with OSs. In one approach, a proprietary OS is developed by implementing proprietary protocols specific to a switching fabric. However, the employment of proprietary OS may be inflexible and may limit the employment or integration with common third party solutions. In a second approach, LCs are integrated with a general OS as remote network devices by employing OS kernel network calls (e.g., socket). For example, the Huawei® Versatile Routing Platform (VRP) and some other embedded OSs may integrate the LCs by employing existing network protocols, such as a bridge port extension protocol developed by Institute of Electrical and Electronics Engineers (IEEE) and described in document 802.1br. However, when the LCs are integrated as remote network devices, a general OS may not present the LCs as local IO devices to the applications, but instead as network connections. In a third approach, onboard application-specific integrated circuit (AMC) chips are integrated with a general OS as local network interface cards (NICs). For example, Cumulus integrated Trident ASICs to Linux® as local NICs PCI or PCIe devices). However, such an approach is limited to local onboard components and may not be applied to remote network devices. In a fourth approach, PCI features are extended to support virtual functions (VFs). For example, single root-IO virtualization (SR-IOV) extends PCI features by designing SR-IOV specifics into hardware. Thus, such an approach is incompatible with other hardware that is not designed to support SR-IOV. Some other industry solutions provide central management of remote devices at an application layer, such as Juniper node unifier (JNU). However, such solutions focus on management, but may not focus on presenting the remote devices as IO resources to applications. In addition, all the approaches described above may not be equipped to support elastic IO reallocation.

Disclosed herein are various embodiments for integrating network LCs to a host OS as general IO devices by mapping network LCs to local vNICs where general IO devices refer to PCI and/or PCIe devices. For example, a host OS may be built with a set of OS kernel IO calls or interfaces for accessing general IO devices. For example, the Linux® OS comprises built-in kernel calls (e.g., ioctl) for interfacing with PCI and/or PCIe devices. vNICs refer to virtual network devices or virtual IO devices logically connected to the physical hardware of the LCs. In the disclosed embodiments, a host OS may employ the network LCs as general IO devices and provide IO services to applications through OS kernel K) calls. For example, the network LCs are remote LCs connected to a host system or host machine via some network connections and provide network and/or IO resources (e.g., memory and network bandwidths) to the host system. The disclosed embodiments employ a LC manager (LCM) to manage and control the usage of the remote LCs. The LCM maps the remote LCs to local vNICs. For example, the LCM may logically split IO resources from a single network LC into multiple portions and map different portions to different local vNICs. Alternatively, the LCM may logically combine IO resources from different remote LCs and map the combined IO resources to a single local vNIC. The host OS may use the local vNICs as local IO devices and applications may access the local vNICs via OS kernel IO interfaces. In an embodiment, the host may employ an IO interface conversion (IOIC) component to perform conversions between the OS kernel IO interfaces and device driver interfaces, which are specific to the hardware of the remote LCs. Since the disclosed embodiments abstract the physical resources of the remote LCs and the usage of the physical resources from the physical hardware of the remote LCs through the local vNICs, the disclosed embodiments may present the physical resources of the remote LCs as an elastic local IO resource pool that that may dynamically adapt to IO demands. In addition, the disclosed embodiments may be suitable for a multi-host system, where a single LCM may be configured to manage remote LCs and provide mappings between the remote LCs and local vNICs for multiple hosts.

FIG. 1 is a schematic diagram of an embodiment of a computer system 100 operating in a single host environment. The system 100 comprises a host hardware 110, a plurality of LCs 120 (e.g., LC1, LC2, LC3, and LC4), and a switch 130. The switch 130 is a physical device configured to connect the LCs 120 to the host 110 via links 131. The links 131 are physical links, which may be optical links, electrical links, or combinations thereof. The switch 130 may employ various switching mechanisms to receive, process, and/or forward data between the LCs 120 and the host hardware 110. The switch 130 may perform flow control to manage the transfer of data between the LCs 120 and the host hardware 110. For example, the switch 130 may be an Ethernet switch and the links 131 may be Ethernet cables. The LCs 120 are any hardware units comprising computing devices and/or storage devices. For example, the LCs 120 may operate as network devices and may further comprise IO ports communicatively coupled to other network devices. In an embodiment, the system 100 may correspond to a chassis system or a server rack at a DC. For example, the host hardware 110 may correspond to a server engine or a server host machine located on a server rack, the LCs 120 may correspond to LCs installed on the server rack, and the switch 130 and the links 131 may form the backplane of the server rack. The LCs 120 may provide IO resources 161 to the system 100. The IO resources 161 may include memory, network bandwidths, network connection ports, and/or other computing resources.

The host hardware 110 may be any computing device suitable for processing data. For example, the host hardware 110 may comprise one or more CPUs, one or more memory devices, bus system, and/or other interface ports. Various software programs and/or components may be executed by the host hardware 110. For example, the host hardware 110 may be configured to execute a plurality of LC device drivers 152 (e.g., LCD1 and LCD2), one or more applications 153, an LCM 154, a plurality of vNICs 160, and a host OS 140.

The LC device drivers 152 are software programs configured to provide software interfaces to the physical hardware of the LCs 120. Thus, the LC device drivers 152 are hardware-specific. For example, the implementations of the LC device drivers 152 are dependent on the physical hardware of the LCs 120 and the interconnect that connects the LCs 120 to the host hardware 110. Some common device driver operations may include device initialization, device configuration, device read, and/or device write. Device initialization refers to the initial configuration of an LCs 120 so that other software components may communicate with the LCs 120. Device configuration refers to subsequent configurations of device-specific parameters (e.g., bandwidths, speeds, and operational modes). Device read refers to the reception or reading of data from the LCs 120. Device write refers to the transmission of data to the LCs 120. The LC device drivers 152 abstract hardware specific operations into software interfaces, which may be referred to as device driver interfaces, that may be invoke by other software components to operate the LCs 120. For example, a software interface for a data write interface may include a block of data and the length of the data to be sent to an LC 120. However, to complete the data write, the LC device driver 152 may perform multiple hardware read and/or write transactions and/or other timing and flow controls. In an embodiment, when an LC 120 is a remote network device connected to the host hardware 110 via a switch 130 over an Ethernet fabric, a corresponding LC device driver 152 may perform Ethernet packet encapsulation and/or decapsulation in additions to data transmission and/or reception according to the Ethernet protocol. In some embodiments, each LC device driver 152 is configured to interface with a particular LC 120 (e.g., LC1). In some other embodiments, a LC device driver 152 is configured to interface with multiple LCs 120 (e.g., LC2, LC3, and LC4).

The host OS 140 may be any general or common OS (e.g., Windows®, Linux®, or Unix®) configured to manage and control hardware resources (e.g., the host hardware 110) and provide services to the applications 153. For example, a software program such as the application 153 or a process may require certain resources such as CPU processing time, memory, files, and/or IO devices to perform a particular task. The host OS 140 may manage the resources and provide services by including various components, such as a process management component, a memory management component, a file management component, an IO system management component, and/or a protection system component. The process management component may perform process (e.g., thread or task) creation, deletion, suspension, and/or resumption. The process management component may also provision mechanisms for process synchronization and/or communication. The memory management component may perform memory allocation and de-allocation and/or track and maintain memory states and/or statuses. For example, the memory management component may assign a memory space for an application 153, load the application 153, and perform memory allocation and de-allocation as required by the application 153. The file management component may perform file and/or directory creation and/or deletion. The file management component may provide additional primitives for files and/or directories manipulations. The IO system management component may interface with device drivers, such as the LC device drivers 152, to transfer IO data to and from IO devices, such as the LCs 120. The protection system component may control accesses by software programs and/or processes. For example, a software program may be allowed to access a certain portion of a memory or hardware, but may not be allowed to access another portion of the memory or hardware.

The host OS 140 further comprises an IO component 148. The IOIC component 148 is a software component configured to interface with the LC device drivers 152 and the IO system management component. For example, an LC device driver 152 may provide a set of device driver calls or device driver interfaces for operating a particular LC 120. When the LC 120 is a networking device, the corresponding LC device driver 152 may provide the set of device driver calls as network device driver calls. However, the host OS 140 may provide a set of OS kernel IO calls (e.g., Linux® ioctl calls) for interfacing with general IO device (e.g., PCI and/or PCIe devices), but not with networking devices. Thus, the OS kernel IO calls may not be compatible with the network device driver calls. The IOIC component 148 functions as a shim layer to the IO system management component to convert between the network device driver calls and OS kernel IO calls. Thus, the IOIC component 148 enables the host OS 140 to present the LCs 120 as general IO devices to the applications 153 and to provide IO services to the applications 153 through the set of OS kernel IO calls. It should be noted that although the IOIC component 148 is shown as a component within the host OS 140, the IOIC component 148 may be configured as an external component to the host OS 140.

The applications 153 are software programs configured to perform specific applications, activities, and/or tasks. In an embodiment of a DC, the applications 153 may include information technology (IT) system applications that handle operations of core businesses and operational data of organizations. In some embodiments, an application 153 may be a virtual machine (VM), which is an emulation or a software implementation of a particular computer system. In such embodiments, the host OS 140 allocates hardware resources from the host hardware 110 and/or the LCs 120 to the VM and handles all hardware interfaces in conjunction with the LC device drivers 152 such that the underlying host hardware 110 is transparent to the VM.

The vNICs 160 are software components configured to operate as virtual IO devices. The vNICs 160 are logically connected to the LCs 120. The vNICs 160 form an abstraction layer between the LCs 120 and the host OS 140. For example, each vNIC 160 operates as a separate IO device and the host OS 140 presents the vNIC 160 to the applications 153 as a local IO device. As such, an application 153 may send and/or receive packets to and/or from the vNIC 160 as if the vNIC 160 is a physical IO device connected locally to the host hardware 110. Thus, while the host hardware 110 is operatively connected to four LCs 120 (e.g., LC1, LC2, LC3, and LC4) as shown in the system 100, the applications 153 operate as if the host hardware 110 is bound to N number of physical IO devices (e.g., vNIC 1 to vNIC N). In an embodiment, the host OS 140 allocates memory from the memory device to the vNICs 160. For example, each vNIC 160 may be associated with a transmit (Tx) queue and a receive (Rx) queue, where the Tx queue may queue outgoing packets that are ready for transmission via the vNIC 160 and the Rx queue may queue incoming packets received via the vNIC 160.

The LCM 154 is a software program configured to manage the LCs 120 and the vNICs 160. The LCM 154 decouples the IO resources 161 provided by the LCs 120 from the physical hardware of the LCs 120 by mapping and/or assigning the IO resources 161 to the vNICs 160. In one embodiment, the LCM 154 logically split resources of a single LC 120 (e.g., LC1) into multiple portions and map different portions to different local vNICs 160 (e.g., vNIC 1 and vNIC 2). In another embodiment, the LCM 154 logically combines IO resources from multiple LCs 120 and map the combined resources to a single local vNIC 160. As such, the LCM 154 may utilize the LCs 120 and/or or the IO resources 161 provided by the LCs 120 as an elastic IO resource pool. Thus, the LCM 154 may dynamically adapt to changes in IO demands by adding additional vNICs 160, deleting unused vNICs 160, and changing the amount of IO resources assigned to a particular vNIC 160 at run-time. IO demands may change in run-time due to various factors. For example, the system 100 may provision for an additional VM (e.g., an additional application 153) at run-time, where the VM may require a certain amount of IO resources. In an embodiment, the LCM 154 is executed in a user-space (e.g., as an application 153). In such an embodiment, the LCM 154 may coordinate with the host OS 140 to create the vNICs 160 and map the vNICs 160 to the LCs 120. It should be noted that the system 100 may be configured as shown or alternatively configured as determined by a person of ordinary skill in the art to achieve the same functionalities.

In an embodiment, when the system 100 is powered-on, the LCM 154 may look up information of the attached LCs 120 and load corresponding LC devices drivers 152. The LC device drivers 152 may perform device initializations to initialize the LCs 120. Upon successful loading and device initialization, the LCM 154 may instruct the host OS 140 to create and/or initialize local vNICs 160 according to the information retrieved from the LCs 120. For example, when the host OS 140 is a Linux® kernel, the local vNICs 160 may be created by employing Linux® tap mechanisms. The Linux® tap mechanisms enable the reception and transmission of packets over a program space (e.g., a virtual kernel network device) instead of a physical media. After the local vNICs 160 are created and initialized, the LCM 154 maps the LCs 120 to the local vNICs 160. Subsequently, the applications 153 may begin to send and/or receive data from the vNICs by employing OS kernel IO calls. It should be noted that when an additional LC 120 is installed while the system 100 is powered-on, the LCM 154 and the host OS 140 may employ similar mechanisms to initialize and create local vNICs 160 for the added LC 120.

When an application 153 requests the host OS 140 to perform an IO write operation to a local vNIC 160, for example, via an OS kernel IO write call (e.g., write byte), the host OS 140 redirects the request to the LCM 154. Upon receiving the request, the LCM 154 performs demapping to determine a LC 120 that corresponds to the local vNIC 160 requested by the application 153. The host OS 140 performs the IO write operation via the IOIC component 148 and a LC device driver 152 corresponding to the LC 120. For example, the IOIC component 148 converts the OS kernel IO write call to a device driver write call provided by the corresponding LC device driver 152. Subsequently, the LC device driver 152 writes the data to the corresponding LC 120 according to the protocol and/or employed by the LC 120. It should be noted that the application 153 may queue data for transmission at the local vNIC 160.

An IO read operation may be performed by employing similar mechanisms as described for the IO write operation. For example, an application 153 may request the host OS 140 to read data from a local vNIC 160 via an OS kernel IO read call (e.g., read byte). The host OS 140 redirects the request to the LCM 154. The LCM 154 performs demapping to determine a LC 120 that corresponds to the local vNIC 160 requested by the application 153. The host OS 140 performs the IO read operation via the IOIC component 148 and a LC device driver 152 corresponding to the LC 120. The IOIC component 160 converts the OS kernel IO read call to a device driver read call provided by the LC device driver 152. The LC device driver 152 reads the requested data from the LC 120 according to the protocol and/or format employed by the LC 120. The IOIC component 160 receives the data read from the LC 120 via a device driver callback or return call provided by the LC device driver 152. The IOIC component 160 may provide the data to the application 153 via an OS kernel IO return call. It should be noted that the LC device driver 152 may queue data received from the LC 120 at the local vNIC 160.

Figure 2:
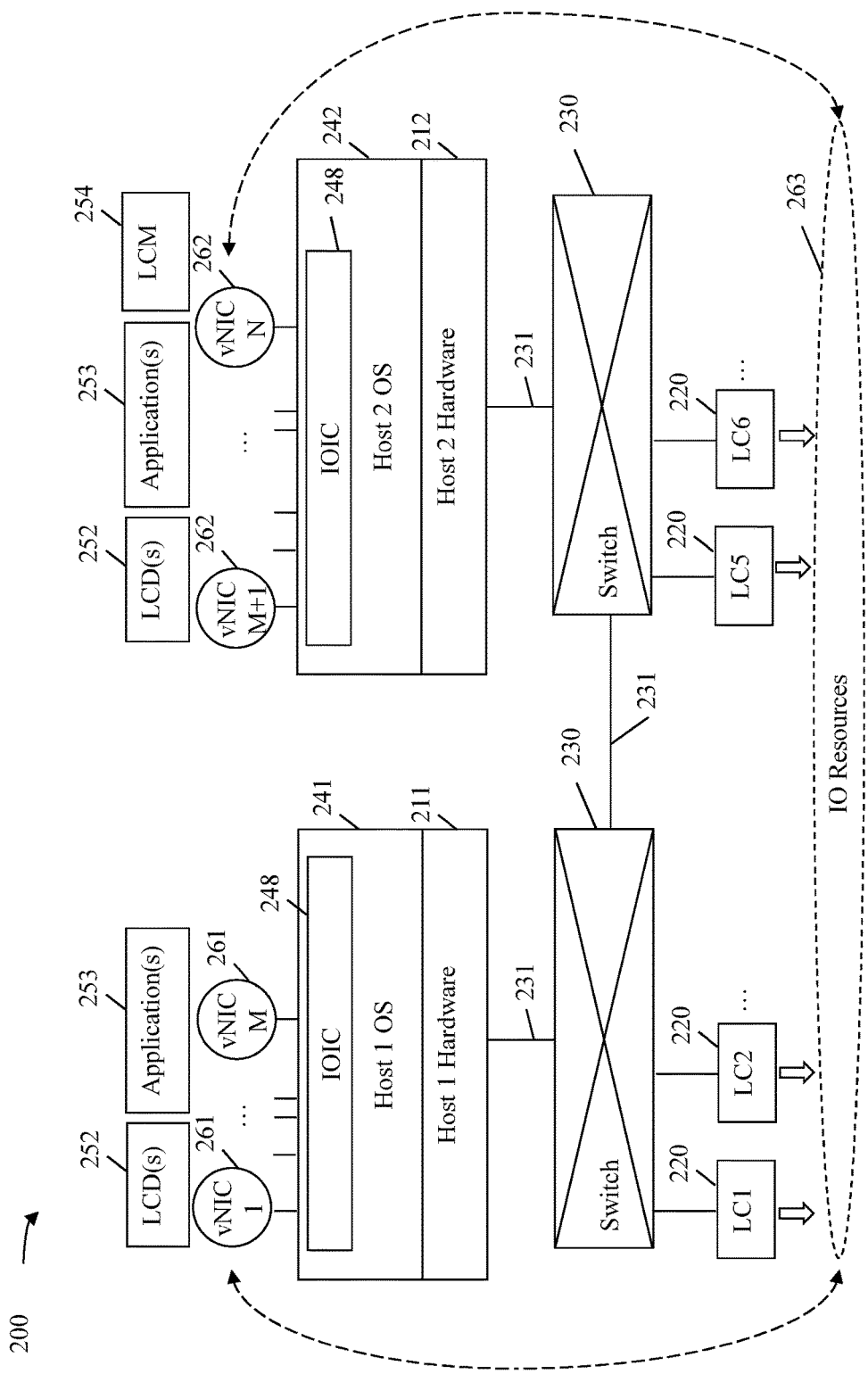
FIG. 2 is a schematic diagram of an embodiment of a computer system operating in a multi-host environment.

FIG. 2 is a schematic diagram of an embodiment of a computer system 200 operating in a multi-host environment. The system 200 is similar to the system 100, but may comprise multiple hosts. For example, the system 200 comprises a first host hardware 211 and a second host hardware 212, which are similar to the host 110. The first host hardware 211 is controlled and managed by a first host OS 241. The second host hardware 212 is controlled and managed by a second host OS 242. The first host OS 241 and the second host OS 242 are similar to the host OS 140. The first host OS 241 and the second host OS 242, each comprises an IOIC component 248 similar to the IOIC component 148. The system 200 further comprises a plurality of switches 230 similar to the switch 130, a plurality of links 231 similar to the links 131, and a plurality of LCs 220 similar to the LCs 120. The LCs 220 provide IO resources 263 to the system 200. The first host hardware 211, the second host hardware 212, and the LCs 220 are interconnected via the switches 230 and the links 231. Similar to the system 100, various software programs and/or components may be executed on the first host hardware 211 and the second host hardware 212. For example, a plurality of LC device drivers 252 similar to the LC device drivers 152 and a plurality of applications 253 similar to the applications 152 may be executed on first host hardware 211 and/or the second host hardware 212. Some applications 253 may be executed on both the first host hardware 211 and the second host hardware 212. However, the LC device drivers 252 are dedicated to a particular hardware. For example, a set of LC device drivers 252 may be executed on the first host hardware 211 and interfaces between the first host OS 241 and the LCs 220, and another set of LC device drivers 252 may be executed on the second host hardware 212 and interfaces between the second host OS 242 and the LCs 120.

Similar to the system 100, the LCs 220 are managed and controlled by an LCM 254 similar to the LCM 154. However, the LCM 254 may distribute the IO resources 263 provided by the LCs 120 among the first host OS 241 and the second host OS 242. For example, the LCM maps a first portion of the IO resources 263 to a first plurality of local vNICs 261 (e.g., vNIC 1 to NIC M) and provides the first plurality of local vNICs 261 to the first host OS 241. Similarly, the LCM 254 maps a second portion of the IO resources 263 to a second plurality of local vNICs 262 (e.g., vNIC M+1 to vNIC N) and provides the second plurality of local vNICs 262 to the second host OS 242. The LCM 254 may interact with the first host OS 241 and/or the second host OS by employing substantially similar mechanisms as described above in the system 100. However, as shown, the LCM 254 is executed on the second host hardware 212. Thus, the LCM 254 may communicate with the first host OS 241 via the links 231 and the switches 230. For example, the LCM 254 may send an IO configuration message to the first host OS 241 to request the first host OS 241 to create the local vNICs 261, the first host OS 241 may send IO access requests to the LCM 254, and the LCM 254 may determine an local vNIC to remote LC mapping for the IO access request and send the mapping to the first host OS 241. It should be noted that the LCM 254 may be configured to manage any suitable number of hosts. In addition, the system 200 may be configured as shown or alternatively configured as determined by a person of ordinary skill in the art to achieve the same functionalities.

Figure 3:
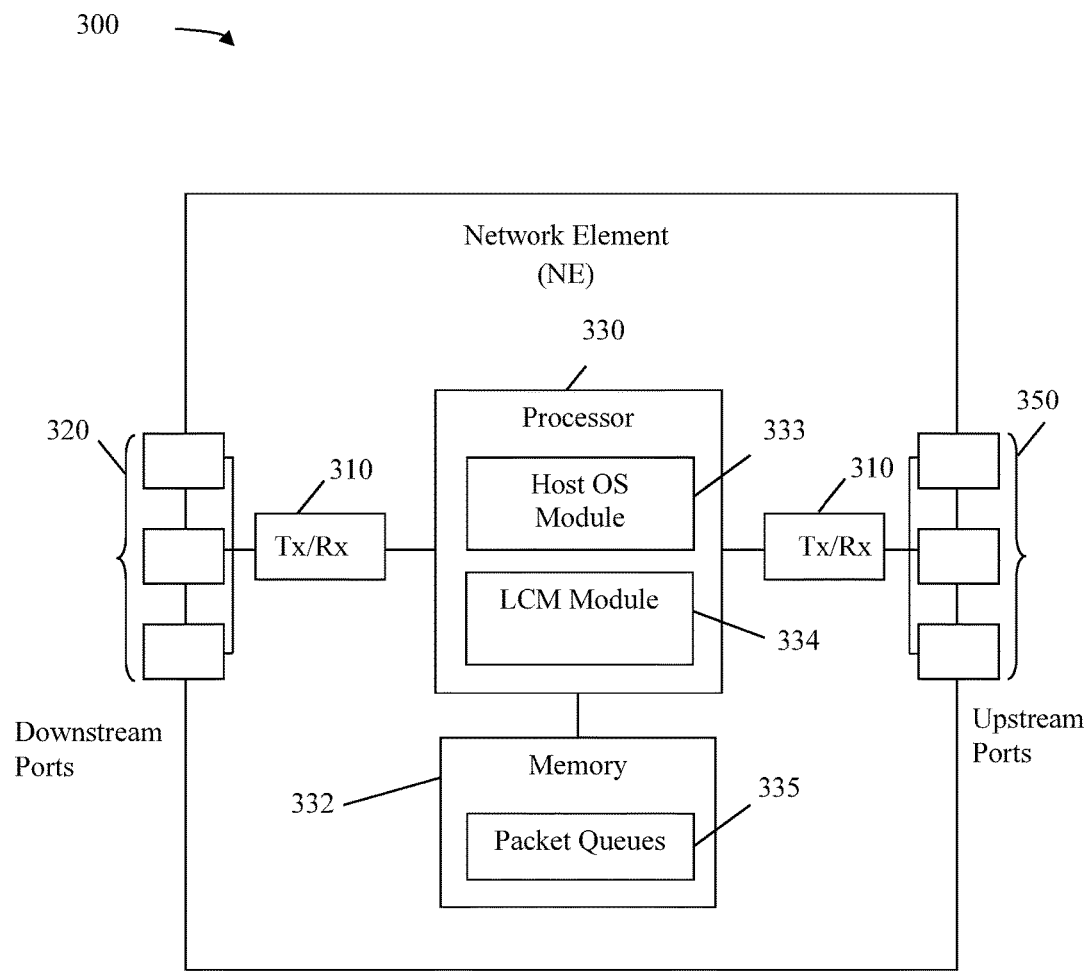
FIG. 3 is a schematic diagram of an embodiment of a network element (NE), which may act as a host in a computer system.

FIG. 3 is a schematic diagram of an example embodiment of an NE 300, which may act as a host in a computer system, such as the systems 100 and 200. For instance, the NE 300 may be a server host at a DC or a network node in a computer network. NE 300 may be configured to implement and/or support the LC management, mapping, and IO resource allocation mechanisms described herein. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 may comprise transceivers (Tx/Rx) 310, which may be transmitters, receivers, or combinations thereof. A Tx/Rx 310 may be coupled to plurality of downstream ports 320 (e.g., IO ports) for transmitting and/or receiving frames from other nodes, such as the LCs 120, and a Tx/Rx 310 may be coupled to plurality of upstream ports 350 (e.g., IO ports) for transmitting and/or receiving frames from other nodes, respectively. A processor 330 may be coupled to the Tx/Rx 310 to process the frames and/or to determine which nodes to send the frames to. The processor 330 may comprise one or more multi-core processors and/or memory devices 332, which may function as data stores, buffers, etc. Processor 330 may be implemented as a general processor or may be part of one or more ASICs and/or digital signal processors (DSPs). Processor 330 may comprise a host OS module 333 and a LCM module 334, which may perform OS operations and LC management operations, respectively, and implement methods 400, 500, 600, 700, 800, and 800 as discussed more fully below. As such, the inclusion of the host OS module 333, the LCM module 334, and associated methods and systems provides improvements to the functionalities of the NE 300. In an alternative embodiment, the host OS module 333 and the LCM module 334 may be implemented as instructions stored in the memory devices 332, which may be executed by the processor 330. The memory device 332 may comprise a cache for temporarily storing content, e.g., a random-access memory (RAM). For example, the memory device 332 may be configured to store one or more packet queues 335. Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
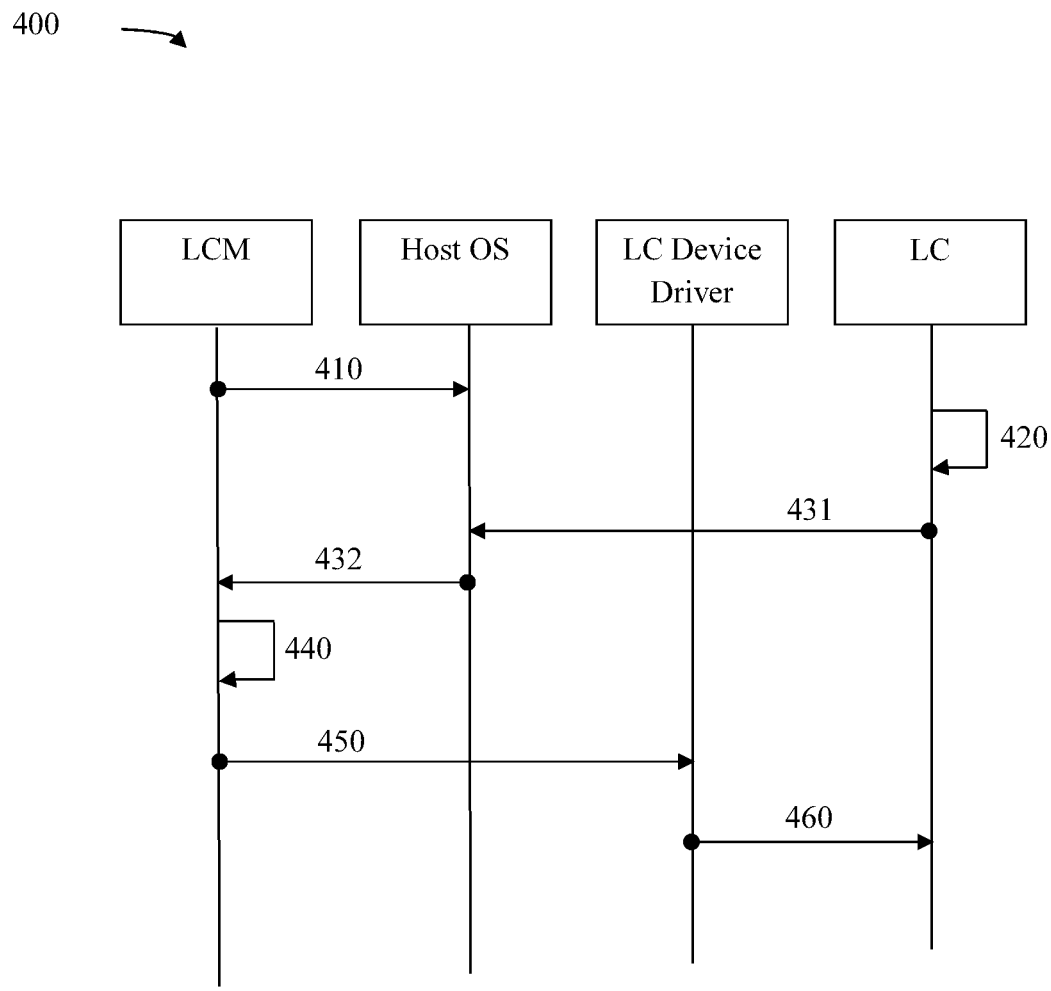
FIG. 4 is a protocol diagram of an embodiment of a method for detecting and initializing network LCs.

FIG. 4 is a protocol diagram of an embodiment of a method 400 for detecting and initializing network LCs, such as the LCs 120 and 220. The method 400 is implemented by a host, such as the systems 100 and 200 and the NE 300. The method 400 is implemented between an LCM, such as the LCMs 154 and 254, a host OS, such as the hosts OS 140, 241, and 242, an LC device driver, such as the LC device drivers 152 and 252, and a network LC. The method 400 begins when the host is powered-up. At step 410, the LCM registers with the host OS to listen to physical events of all network LCs in the system. At step 420, a network LC is inserted, for example, into a slot of the host by a user. At step 431, the insertion of the network LC triggers a physical event (e.g., an indication signal or an interrupt signal), which is first received by the host OS. At step 432, the host OS dispatches the physical event to the LCM since the LCM registered with the host OS to listen to the physical events of the LC at step 410. At step 440, upon receiving the physical event, the LCM retrieves information for the network LC and selects a corresponding LC device driver. Some network LC information may include the type of IOs, the bandwidth and/or the throughput supported by the network LCs. At step 450, the LCM loads the corresponding LC device driver. At step 460, when the LC device driver is loaded, the LC device driver configures and/or initializes the network LC, for example, by sending one or more write commands to the LC.

Figure 5:
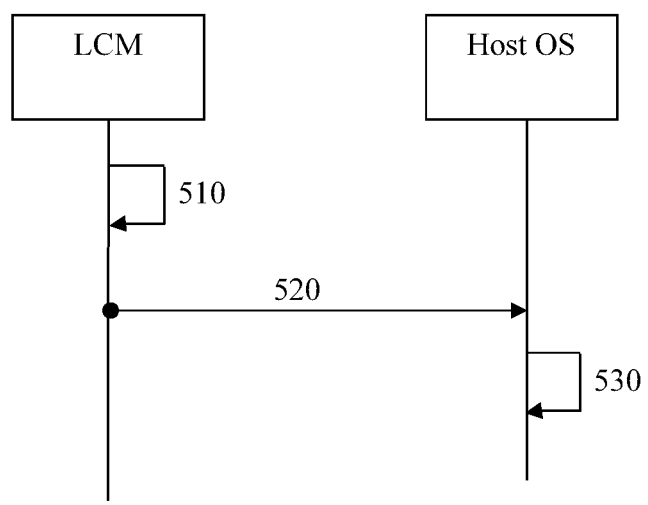
FIG. 5 is a protocol diagram of an embodiment of a method for mapping network LCs to local vNICs.

FIG. 5 is a protocol diagram of an embodiment of a method 500 for mapping network LCs to local vNICs. The method 500 is implemented by a host, such as the systems 100 and 200 and NE 300. The method 500 is implemented between an LCM, such as the LCMs 154 and 254, and a host OS, such as the hosts OS 140, 241, and 242. The method 500 begins after the host has successfully detected and initialized connected network LCs, for example, by employing the method 400. At step 510, the LCM determines local vNICs, such as the local vNICs 160, 261, and 262, and performs mapping between the local vNICs and the network LCs according to LC information retrieved previously during LC detection and initialization (e.g., at step 440 of the method 400). For example, the LCM may store a map that maps the network LCs to the local vNIC. In an embodiment, the LCM may logically split the IO resources of a single network LC into multiple portions and map different portions to different local vNICs. In another embodiment, the LCM may logically combine IO resources from multiple network LCs and map the combined IO resources to a single local vNIC. In yet another embodiment, the LCM may map all IO resources of a single network LC to a single local vNIC. At step 520, the LCM instructs the host OS to create and/or initialize the local vNICs by providing information of the network LCs and the allocated resources. At step 530, the host OS creates and initializes the local vNICs according to the instructions received from the LCM. For example, when the host OS is a Linux® kernel, the host OS may create the local vNICs by employing Linux® tap mechanisms.

Figure 6:
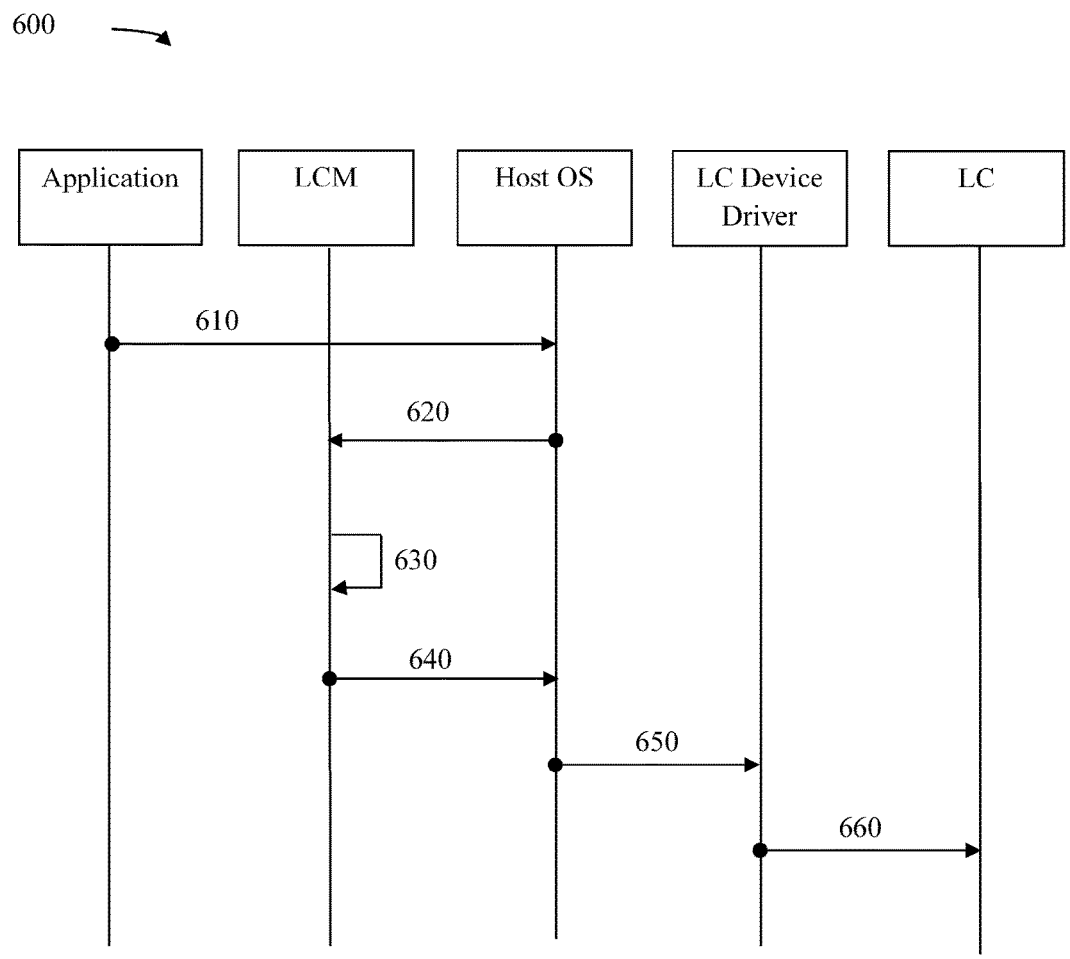
FIG. 6 is a protocol diagram of an embodiment of a method for providing local IO services to applications.

FIG. 6 is a protocol diagram of an embodiment of a method 600 for providing local IO services to applications. The method 600 is implemented by a host, such as the systems 100 and 200 and the NE 300. The method 600 is implemented between an application, such as the applications 153 and 253, an LCM, such as the LCMs 154 and 254, a host OS, such as the hosts OS 140, 241, and 242, an LC device driver, such as the LC device drivers 152 and 252, and a network LC, such as the LCs 120 and 220. The method 600 begins after the host has created and initialized local vNICs based on network LCs that are connected to the host, for example, by employing the method 500. For example, the host OS has assigned a local vNIC to an application. At step 610, the application sends a request to the host OS to access the local vNIC, for example, via an OS kernel IO call. At step 620, upon receiving the request, the host OS forwards the request or at least the information associated with the requested local vNIC to the LCM. At step 630, upon receiving the information, the LCM performs a demapping function to determine a LC device driver that corresponds to the requested local vNIC. For example, the LCM may previously store a map that maps the network LCs to the local vNIC. At step 640, after determining the corresponding LC device driver, the LCM instructs the host OS to employ the corresponding LC device driver to complete the IO access. At step 650, the host OS continues with the processing of the IO access by sending the request to the LC device driver provided by the LCM. As described above, the host OS may employ an IOIC component, such as the IOIC components 148 and 248, to convert the OS kernel IO call to a device driver call. At step 660, upon receiving the request, the LC device driver interfaces with a corresponding LC to perform IO operations according to the request. It should be noted that there may be multiple IO transactions between the LC and the LC device drivers. In addition, upon completion of the IO request, the LC device driver may send a signal back to the host OS to indicate the completion and the host OS may further notify the application.

In an embodiment of a DC, when the IO request is an IO read request, the data read from the physical LC may be routed from a backplane switch, such as the switches 130 and 230. The switch may process the data by performing encapsulation and/or demultiplexing. When the LC device driver receives the data, the LC device driver may queue the data at a packet queue or Rx queue, such as the packet queues 335, of the corresponding local vNIC. Similar operations may be performed on data for IO write, but the operations may be in a reverse order. For example, the data may be queued at a packet queue or Tx queue of the local vNIC, the switch may perform encapsulation and demultiplexing on the data prior to sending the data to a corresponding network LC.

Figure 7:
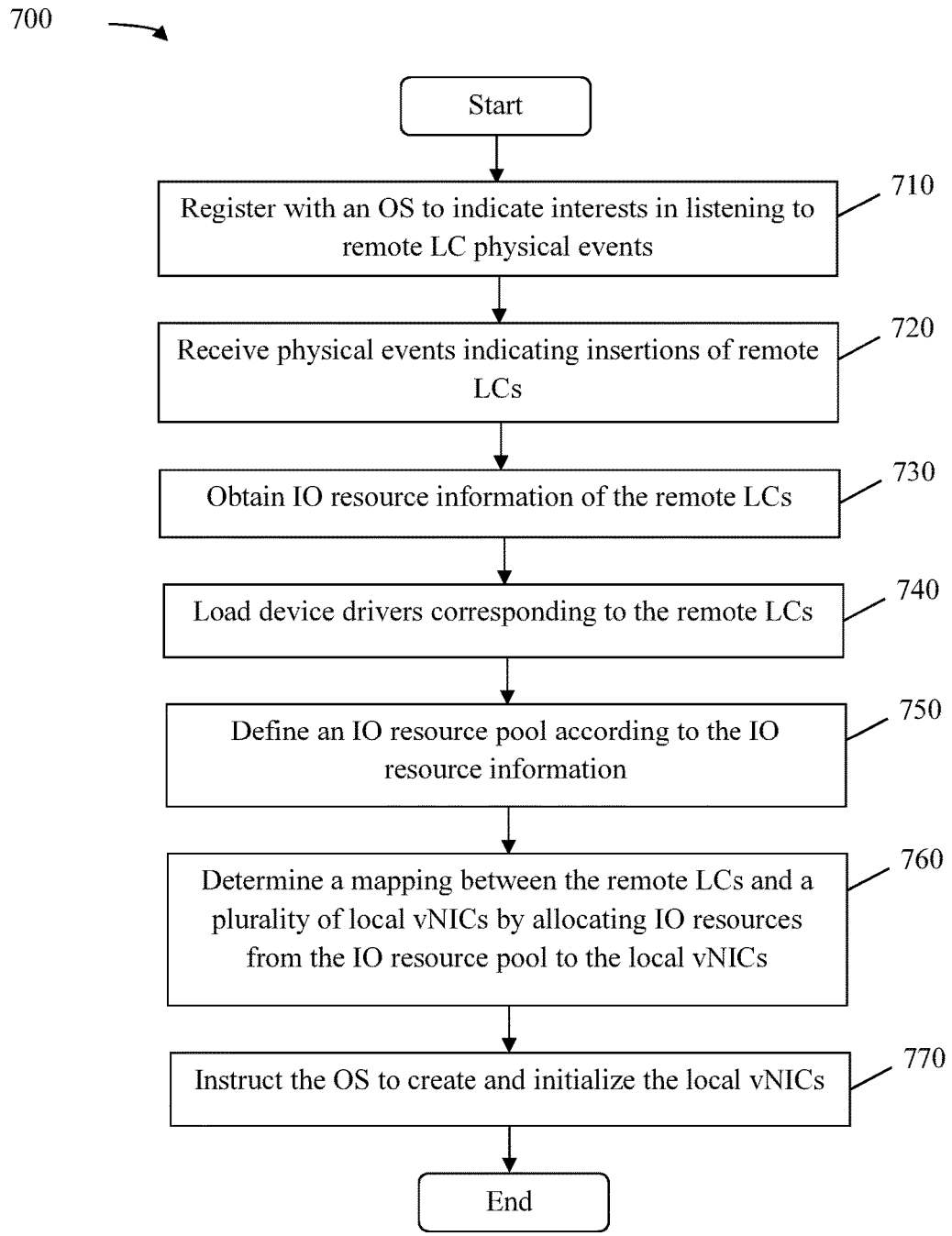
FIG. 7 is a flowchart of an embodiment of a method for defining a local IO resource pool.

FIG. 7 is a flowchart of an embodiment of a method 700 for defining a local IO resource pool. The method 700 is implemented by a LCM, such as the LCMs 154 and 254. The method 700 is implemented when a host system, such as the host systems 100 and 200, is powered-up. The method 700 is similar to the methods 400 and 500. For example, the host system is under the control of an OS, such as the host OSs 140, 241, and 242. At step 710, interest in listening to remote LC physical events is registered with the OS. For example, the remote LC physical events may include an insertion of a remote LC, such as the LCs 120 and 220. At step 720, physical events are received indicating insertions of remote LCs. For example, when a remote LC is inserted or installed, an interrupt signal may be sent to the OS. The OS may map the interrupt signal to a physical event and send the physical event to a software component that is registered to listen to the physical event. At step 730, upon receiving the physical event, IO resource information (e.g., IO types and resource capacity) of the remote LCs is obtained. In addition, other information associated with LC board properties may be obtained. At step 740, device drivers corresponding to the remote LCs are loaded. For example, when the device drivers are loaded, the device drivers may initialize and/or configure corresponding remote LCs so that the remote LCs may be ready for operations. At step 750, an IO resource pool is defined according to the IO resource information. At step 760, a mapping between the remote LCs and a plurality of local vNICs, such as the local vNICs 160, 261, and 262, are determined by allocating IO resources from the IO resource pool to the local vNICs. For example, the LC may store the mapping in a memory device, such as the memory device 332. In an embodiment, the LCM may allocate all IO resources from a single remote LC to a single local vNIC. In another embodiment, the LCM may logically split the IO resources of a single remote LC between multiple local vNICs. In yet another embodiment, the LCM may allocate IO resources from different remote LCs to a single local vNIC. At step 770, an instruction to create and initialize the local vNICs is sent to the OS. For example, the OS may provide IO services to applications by presenting the local vNICs as local IO devices and may enable the applications to access the local vNICs via OS kernel IO calls and/or interfaces.

Figure 8:
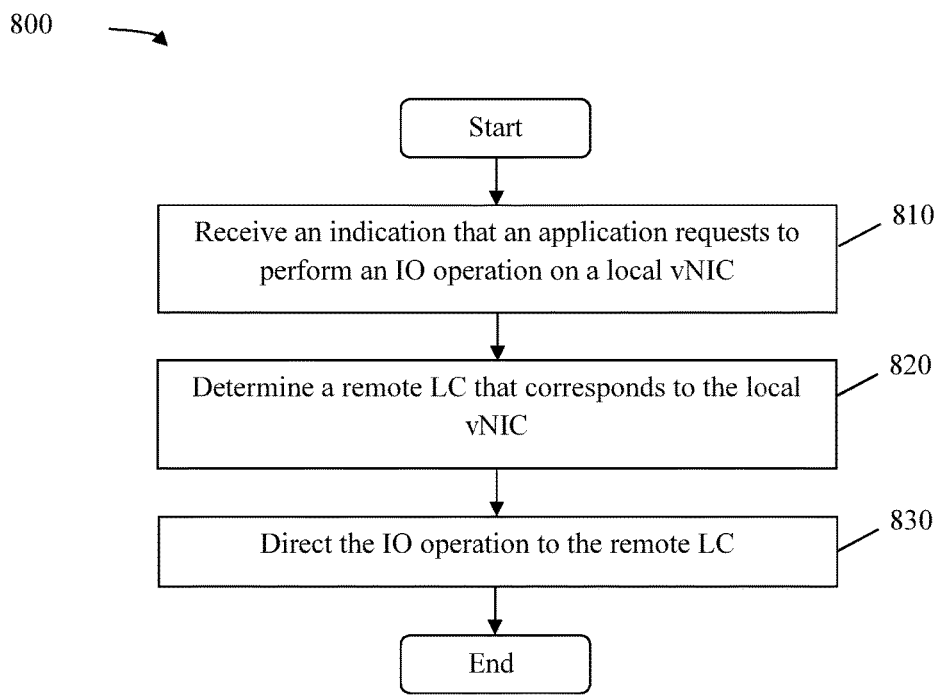
FIG. 8 is a flowchart of an embodiment of a method for providing local IO services to applications.

FIG. 8 is a flowchart of an embodiment of a method 800 for providing local IO services to applications. The method 800 is implemented by a LCM, such as the LCMs 154 and 254. The method 800 is implemented after a host system, such as the systems 100 and 200, has mapped remote LCs, such as the LCs 120 and 220 to local vNICs, such as the local vNICs 160, 261, and 262, for example, by employing the method 700. For example, the host system may be operated under a host OS, such as the host OSs 140, 241, and 242, and the host OS may assign a local vNIC to an application. At step 810, an indication that the application requests to perform an IO operation on the local vNIC is received, for example, from the OS. At step 820, upon receiving the indication, a remote LC that corresponds to the local vNIC is determined, for example, according to a mapping between the remote LCs and the local vNICs previously stored (e.g., at step 760). At step 830, the IO operation is directed to the remote LC. For example, the LCM may instruct the OS to proceed with the IO operation directing towards the remote LC via an LC device driver, such as the LC device drivers 152 and 252, corresponding to the remote LC. Alternatively, the LCM may request the LC device driver corresponding to the remote LC to perform the IO operation directly.

Figure 9:
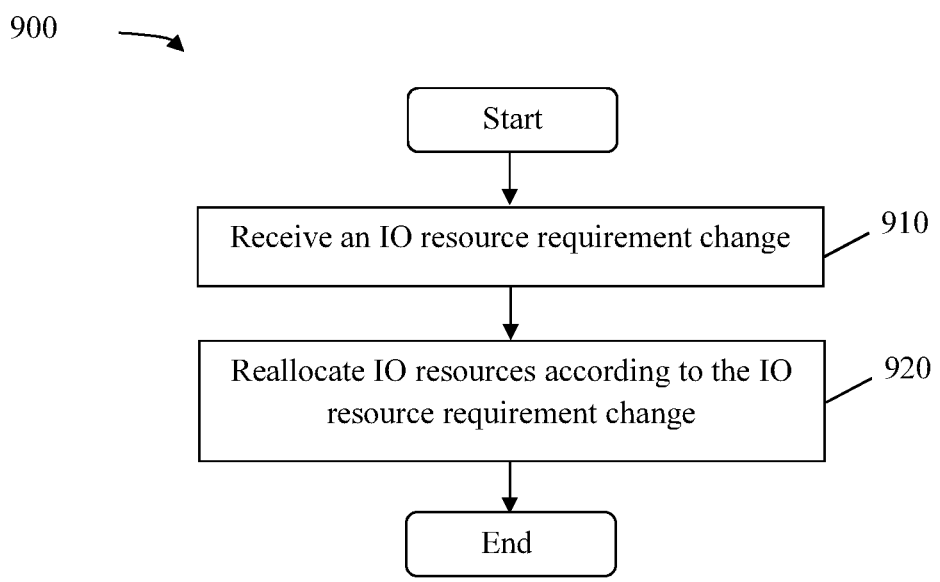
FIG. 9 is a flowchart of an embodiment of a method for providing an elastic local IO resource pool.

FIG. 9 is a flowchart of an embodiment of a method 900 for providing an elastic local IO resource pool. The method 900 is implemented by a LCM, such as the LCMs 154 and 254. The method 900 is implemented when a host system, such as the host systems 100 and 200, is in operation (e.g., after applying the methods 400, 500, 600, 700, and/or 800). For example, an IO resource pool is created from remote LCs, such as the remote LCs 120 and 220, connected to the host system and IO resources provided by the remote LCs are allocated to local vNICs, such as the local vNICs 160, 261, and 262. At step 910, an IO resource requirement change is received, for example, from an OS such as the host OS 140, 241, and 242. For example, an application employing a local vNIC may desire to increase or decrease the amount of IO resources and may request the OS to increase or decrease the amount of IO resources. Alternatively, an application may terminate IO operations on a local vNIC, and thus the host OS may request to remove the local vNIC. At step 920, upon receiving the IO resource requirement change, IO resources are reallocated according to the IO resource requirement change. For example, when the change requires a larger amount of IO resources for a particular local vNIC, the LCM may allocate a larger amount of IO resources from the IO resource pool to the local vNIC. Alternatively, when the change requires less IO resources for a particular local vNIC or to terminate a particular local vNIC, the LCM may return the IO resources allocated to the particular local vNIC back to the IO resource pool. As such, IO resources may be dynamically reallocated according to IO demands.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a plurality of physical input/output (IO) ports configured to couple to a plurality of remote linecards (LCs) that provide IO resources; and
   a processor coupled to the plurality of physical IO ports and configured to:
      map the remote LCs to a plurality of virtual network interface cards (vNICs) by allocating at least some of the IO resources to the vNICs;
      receive an operating system (OS) kernel IO call comprising a request to access a first vNIC from the plurality of vNICs;
      determine a first remote LC, from the plurality of remote LCs, that corresponds to the first vNIC;
      determine a LC device driver for the first remote LC based on the first vNIC via a demapping function;
      convert the OS kernel IO call into a device driver call for the determined LC device driver, the device driver call containing the request to access the first vNIC and including a format employed by the first remote LC; and
      direct the device driver call containing the request to the first remote LC.

2. The apparatus of claim 1, wherein the processor is further configured to allocate the IO resources to the vNICs by:
   dividing IO resources of one of the LCs logically into at least a first portion and a second portion;
   assigning the first portion to one vNIC; and
   assigning the second portion to another vNIC.

3. The apparatus of claim 1, wherein the processor is further configured to allocate the IO resources to the vNICs by:
   assigning at least a first portion of the IO resources associated with one remote LC to the first vNIC; and
   assigning at least a second portion of the IO resources associated with another remote LC to the first vNIC.

4. The apparatus of claim 1, wherein the first vNIC is allocated with a first amount of the IO resources, and wherein the processor is further configured to:
   receive a change request to change the first amount of the IO resources; and
   reallocate a second amount of the IO resources to the first vNIC according to the change request.

5. The apparatus of claim 4, wherein the IO resources comprise memory, bandwidths, network ports, computing resources, or combinations thereof, and wherein the first amount of the IO resources comprises a size of the memory, an amount of the bandwidths, a number of the network ports, a portion of the computing resources, or combinations thereof.

6. The apparatus of claim 1, wherein the physical IO ports are coupled to the remote LCs via an interconnection, and wherein the device driver call is associated with the first remote LC and the interconnection.

7. The apparatus of claim 6, wherein the interconnection comprises an Open System Interconnection (OSI) Layer 2 (L2) network connection, an OSI Layer 3 (L3) network connection, a switching fabric, or combinations thereof.

8. The apparatus of claim 1, wherein the processor is further configured to:
provision a virtual machine (VM); and
assign the first vNIC to the VM, wherein the OS kernel IO call is received from the VM.

9. The apparatus of claim 1, wherein the physical IO ports are further configured to couple to a remote host, and wherein at least one of the vNICs is associated with the remote host.

10. A method implemented by a local server host that operates under an operating system (OS), comprising:
obtaining input/output (IO) resource information of a plurality of remote linecards (LCs) coupled to the local server host via one or more switches;
defining an IO resource pool according to the IO resource information of the remote LCs;
determining a mapping between the remote LCs and a plurality of virtual network interface cards (vNICs) by allocating IO resources from the IO resource pool according to the IO resource information of the remote LCs;
reallocating IO resources in the IO resource pool based on IO demands by updating the mapping between the remote LCs, coupled to the switches, and the vNICs;
receiving an operating system (OS) kernel IO call comprising a request to access a first vNIC from the plurality of vNICs;
determining a first remote LC from the plurality of remote LCs that corresponds to the first vNIC; and
directing the request to access the first remote LC.

11. The method of claim 10, wherein the remote LCs are connected to the local server host via an interconnection associated with a network protocol comprising an Open System Interconnection (OSI) Layer 2 (L2) protocol, an OSI Layer 3 (L3) protocol, or combinations thereof, and wherein the method further comprises performing IO interface conversion between the OS kernel IO call and a device driver call associated with the first remote LC and the interconnection.

12. The method of claim 11, wherein the OS kernel IO call is associated with a Peripheral Component Interconnect (PCI) device or a PCI-Express (PCIe) device.

13. The method of claim 10, wherein reallocating IO resources in the IO resource pool based on IO demands includes:
receiving an IO resource requirement change; and
reallocating the IO resources of the IO resource pool dynamically in response to the IO resource requirement change,
wherein the IO resource requirement change comprises an increased amount of IO resources for a first of the vNICs, a decreased amount of IO resources for a second vNIC from the plurality of vNICs, an addition of an additional vNIC, a deletion of an existing vNIC, or combinations thereof.

14. The method of claim 13, wherein the IO resource pool comprises memory, bandwidths, network ports, computing resources, or combinations thereof, and wherein an amount of the IO resources comprises a size of the memory, an amount of the bandwidths, a number of the network ports, a portion of the computing resources, or combinations thereof.

15. The method of claim 11, further comprising:
sending an IO configuration to a remote server host coupled to the local server host, wherein the IO configuration comprises configuration information associated with at least a second of the vNICs;
receiving an IO request from the remote server host to access the second vNIC;
determining a second of the remote LCs that corresponds to the second vNIC; and
sending an IO map to the remote server host to instruct the remote server host to access the second remote LC.

16. An apparatus comprising:
a plurality of physical input/output (IO) ports configured to couple to:
a plurality of remote linecards (LCs), via one or more switches, the plurality of remote LCs providing IO resources; and
a remote host; and
a processor coupled to the plurality of physical IO ports and configured to:
obtain resource information of the plurality of remote LCs;
define an IO resource pool according to the resource information of the remote LCs;
determine a mapping between the remote LCs and a plurality of virtual network interface cards (vNICs) by allocating IO resources to the vNICs from the IO resource pool, wherein at least a first vNIC from the plurality of vNICs is associated with the remote host;
reallocate IO resources in the IO resource pool based on IO demands by updating the mapping between the remote LCs, coupled to the switches, and the vNICs; and
send, via the IO ports, a configuration message to the remote host, wherein the configuration message comprises configuration information associated with the first vNIC.

17. The apparatus of claim 16, wherein the processor is further configured to:
receive, via the IO ports, an IO access message from the remote host indicating an IO access associated with the first vNIC;
determine a first remote LC that corresponds to the first vNIC according to the mapping; and
send, via the IO ports, a mapping message to the remote host to instruct the remote host to direct the IO access to the first remote LC that corresponds to the first vNIC.

18. The apparatus of claim 17, wherein the processor is further configured to:
receive a request to add an additional vNIC;
create the additional vNIC; and
allocate at least some of the IO resources to the additional vNIC.

19. The apparatus of claim 16, wherein the processor is further configured to:
receive a request to terminate IO operations for the first vNIC;
determine a first remote LC that corresponds to the first vNIC and a portion of IO resources of the first remote LC allocated to the first vNIC according to the mapping between the remote LCs and the vNICs; and return to the IO resource pool the portion of the IO resources of the first remote LC employed by the first vNIC.

20. The apparatus of claim 16, wherein the physical IO ports couples to the remote LCs via an interconnection, and wherein the processor is further configured to:
receive an operating system (OS) kernel IO call comprising a request to access a second vNIC from the plurality of vNICs associated with the apparatus;
determine a second remote LC from the plurality of remote LCs that corresponds to the second vNIC; and
direct the request to access the second remote LC.

* * * * *